2 Sheets—Sheet 1.
S. E. AMENT.
Revolving Rake.
No. 1,732.
Reissued July 26, 1864.
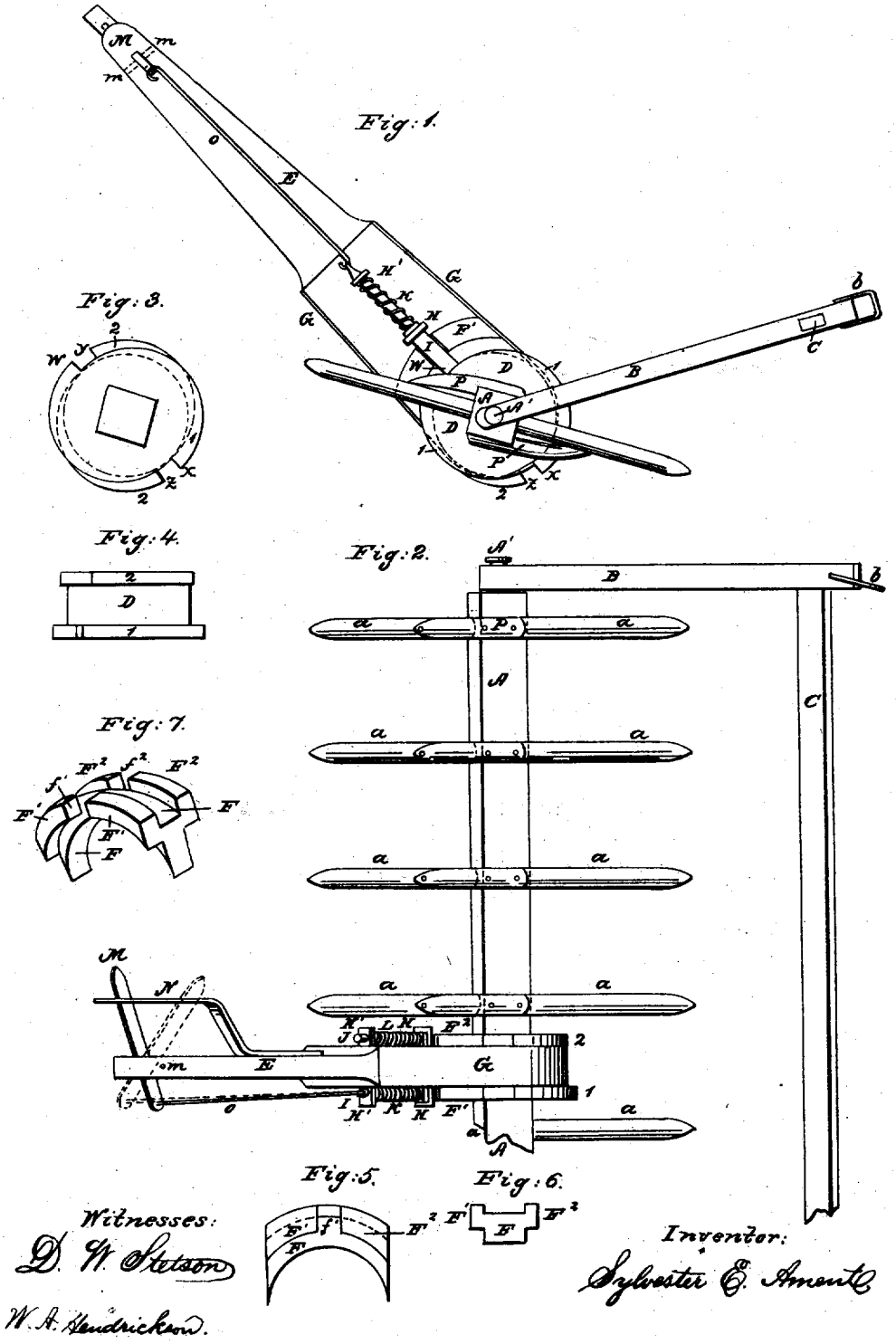
Witnesses:
D. W. Stetson
W. A. Hendrickson.
Inventor:
Sylvester E. Ament
N. PETERS, Photo-Lithographer, Washington, D. C.

2 Sheets—Sheet 2.

S. E. AMENT.

Revolving Rake.

No. 1,732.

Reissued July 26, 1864.

Witnesses:
D. W. Stetson.
W. A. Hendrickson.

Inventor:
Sylvester C. Ament.

N. PETERS, Photo-Lithographer, Washington, D. C.

UNITED STATES PATENT OFFICE.

SYLVESTER E. AMENT, OF OSWEGO, ILLINOIS.

IMPROVEMENT IN REVOLVING RAKES.

Specification forming part of Letters Patent No. 41,169, dated February 9, 1864; Reissue No. 1,732, dated July 26, 1864.

*To all whom it may concern:*

Be it known that I, SYLVESTER E. AMENT, of Oswego, in the county of Kendall, in the State of Illinois, have invented certain new and useful Improvements in Revolving Rakes; and I do hereby declare that the following is a full and exact description thereof, prepared with a view to the obtaining of Letters Patent therefor, reference being had to the accompanying drawings, which form a part of this specification.

Figure 1:
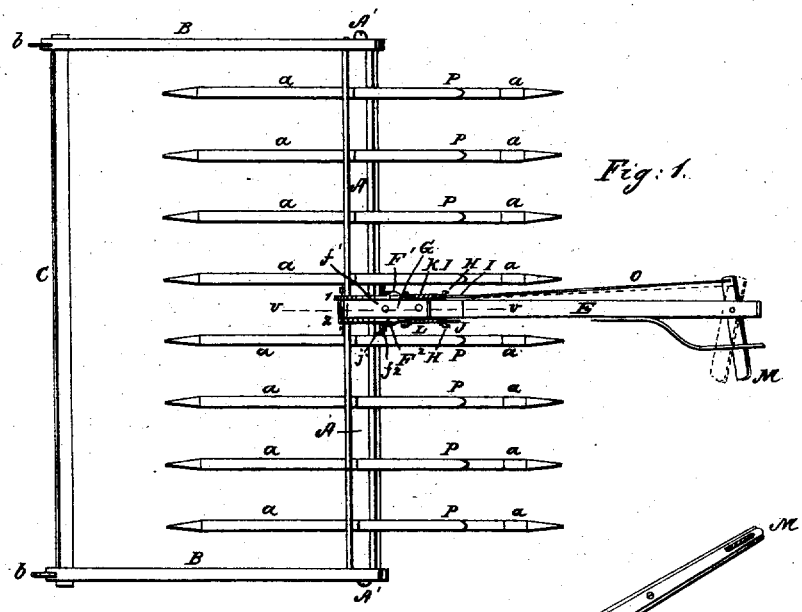
Figure 2:
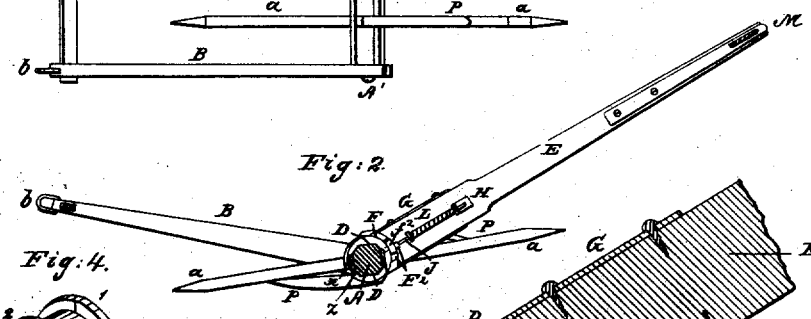
Figure 4:
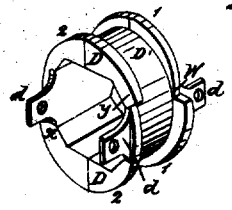
Figure 3:
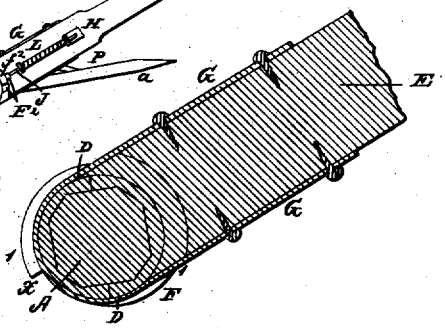
Figure 5:
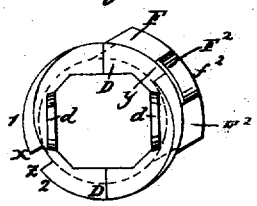
Figure 6:
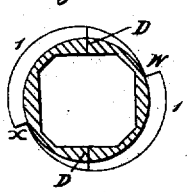

Figure 1 is a side elevation, and Fig. 2 is a plan view, of the machine, both having the several parts applied together for use. Fig. 3 is a side view, and Fig. 4 a plan view, of a portion detached from the machine. Fig. 5 is a side view, Fig. 6 a central cross-section, and Fig. 7 a perspective view, of another portion, also detached from the machine.

Similar letters of reference indicate like parts in all the drawings.

The parts at the center, where the handle and its locking-bolts are connected to the shaft are designedly represented larger than an adherence to strict proportion would permit, in order that their construction might be more plainly exhibited. When due regard is had for the proportion, the teeth-braces prevent these parts from touching on the ground, as will be readily understood. Tints are introduced to aid in distinguishing parts, and do not imply difference in the materials. A great proportion of the material may be of hard wood. Certain parts which are to be of iron will be distinctly described as such.

My improvements relate to rakes which slide upon the earth, the teeth bearing very nearly a horizontal position thereto, and adapted to discharge the hay at the will of the operator by a half-revolution of the rotating parts.

To enable others skilled in the art to make and use my invention, I will proceed to describe it by the aid of the drawings and of the letters of reference marked thereon.

A is the revolving shaft, and *a a* the teeth fixed therein. The bearings A′ A′ at the ends of A are carried in bars B B, and these are united by the cross-rail C, arranged as represented. Tugs (not represented) connect the horse to the links or clevises *b b* at the forward end of B B.

P P are straps or braces, of wood, having the form and arrangement represented, and secured by screws or otherwise directly to A and *a*, and are used upon each tooth for the purpose of keeping every tooth in the set from springing from its range. In rakes of this kind it is very important that no tooth becomes bent or warped, so as to stand out of the plane of its fellows. Braces applied to the exterior teeth of the set, and indirectly connected through a post extending downward from the shaft, have been before employed in revolving rakes; but they were not able to perform the effect of my invention, and were employed for another purpose—*i. e.*, to strengthen the outer teeth and form shoes on which the machine might slide. My braces, by reason of their direct union with A and their application to every tooth in the series, keep the points always and at all times in line. Iron braces might be used instead of wooden ones, if so desired; but wooden ones are now preferred for several reasons. They are less expensive and more efficient. A wrought-iron brace is liable to be bent, and thus throw a tooth out of line, while a cast one is apt to get broken, which would thus deprive the tooth of a brace entirely.

On the middle of the revolving shaft A is fixed a metallic bearing-girdle, D, having a cylindrical bearing, D′, upon it, with a flange, 1, on the right-hand side, and a flange, 2, on the left-hand side, arranged as represented.

I prefer to make the metallic bearing-girdle D in two halves, and apply it upon the shaft A by means of lugs and bolts, (not represented, but which will be readily understood by mechanics.)

The handle E, is by means of a peculiar casting, F, and strap G, fitted upon the cylindrical bearing D′ in such a manner as to allow the said bearing, with the parts on which it is fixed, to revolve freely except when it is prevented by other means.

The flanges 1 and 2 prevent the handle from working to the right or to the left, so that it is firmly confined to that space or position upon the rotating part designedly allotted thereto.

The peripheries of the flanges 1 and 2 are not circular, but are each armed with two eccentric projections, as represented. Each projection has one face standing radial, or nearly so, to the axis of the shaft A. The other face of each projection is sloped away nearly to the perpendicular face of the next projection, so as to give the exterior of each flange a form described very nearly by two arcs of a volute curve or spiral. But there will be observed a very marked difference in in the flanges 1 and 2. The perpendicular faces W X on the flange 1 are adapted to meet a suitable stop to prevent the rake from rotating forward, and the faces Y Z on the flange 2 to meet a suitable stop to prevent the rake from rotating backward.

The casting F and additional guides H H′ on the sides of the handle E carry stout bolts I and J, each capable of sufficient end motion to meet or avoid the projections described. The casting F affords protection to the end of the handle E from friction with the bearing D′, and also secures much strength and firmness to the connection between them. The thick flanges or cheeks F′ F², cast upon each side of F, inclose or embrace the end of E between them. The bolts I and J traverse in deep rectangular notches $f'$ $f^2$ therein, and are thus very strongly guided and supported. The office of the deep notches $f'$ $f^2$ may be performed by holes through the cheeks F′ F² instead of notches, if preferred, and in such case the set H of additional guides for the bolts I J may be dispensed with.

The bolts I and J are not connected together, but operate independently of each other, and are provided with coiled springs K L, which urge each toward the center of the shaft A. When both the bolts I and J, by the tension of their respective springs, press upon the periphery of their respective flanges—the end of the bolt I on the periphery of the flange 1, and the end of the bolt J on the periphery of the flange 2—the rotation of the rake causes the perpendicular face *w* to be brought against the bolt I, which stops the revolution, and the bolt J at the same instant, by the action of the spring L, drops down the perpendicular face Y on the opposite flange, 2. The revolving parts are by this means rigidly confined without liberty to turn in either direction within the lever E so long as the parts I and J remain in such position.

The machine is used while the operative parts are thus adjusted, and drawn along accumulating the hay until when the attendant wishes to discharge the load by a half-revolution of the revolving parts. At this juncture he operates a slight lever, M, and its connections, throwing the parts into the position shown by the red lines. This movement, through the connection O, draws the bolt I entirely out of contact with the perpendicular faces on the flange 1, which thereby allows the latter, together with all the rotating parts, to perform a half-revolution and drop the hay at the point desired. During this half-revolution the operator draws back the lever M, so that the bolt I, under the influence of the spring K, presses again upon the periphery of the flange 1, and as it rotates travels down the inclined or volute surface to meet the next face, X, while at the same time the opposite bolt, J, is, by the inclined form of the flange 2, pushed back without offering any considerable resistance; but at the same instant that the bolt I meets either radial or perpendicular face on the flange 1 and causes the revolution to stop, the bolt J drops into contact with one of the corresponding reversed faces on the flange 2, and guards against any retrograde movements or turning of the parts in the wrong direction.

The office of the bolt J, acting against the faces on the flange 2, is mainly important when the handle E is elevated to aid the revolving parts to commence their revolution.

It will be observed, again, that the bolts I and J have sufficient end motion to meet or avoid the faces described. The springs K L urge each toward the center of the shaft A, and by the sectional eccentric peripheries of the flanges 1 and 2 and the lever M are compelled at the proper time and for the proper purpose to recede therefrom, so that between the sectional eccentric peripheries of the flanges 1 and 2 and the lever M, on the one hand, and the springs K L on the other the sliding bolts I and J are made to reciprocate freely and in a manner sufficiently to meet or avoid the faces W X and Y and Z, as described.

Some of the advantages due to certain features of my improvements herein described may be enumerated as follows: First, by reason of the employment of the metallic bearing-girdle D upon the shaft A, as herein described, I greatly save the strength of said shaft in obviating the necessity of turning away the wood to form a round place or neck whereupon to attach the handle E, and I also thereby provide a bearing to which the handle E may be tightly clasped and snugly attached, and yet safely endure the friction due to such attachment without any or but little detriment to the rotating parts; second, by reason of the flanges 1 and 2 being situated as described, and formed of the material as herein set forth, I am able to prevent the handle E from working to the right or to the left, and by reason of their forming permanent resistances, when considered relatively to the right-and-left motion of the outer end of the handle, I am able to shift the rake sidewise and to guide it with precision; third, by reason of the peculiar adaptedness to each other of the sectional eccentric peripheries of the flanges 1 and 2, springs K L, reversed faces W X Y Z, and bolts I J, I am able to arrest and to lock the rotation of the rake-shaft A with ease, security, and rigidness; fourth, by reason of the employment of the cast bush or saddle F between the end of the handle E and the bearing D′, I am able to make a firmer connection of the handle to the bearing and to protect the end of said handle from friction with the bearing D′, and by which I also thereby provide a more durable material for the reception of the friction due to that part of the clasp or box than that which would be otherwise occupied by the mere wood end of the said handle, while in the side cheeks, $F' F^2$, there are provided a front set of stouter guides for the bolts I and J than could otherwise be possessed; fifth, by reason of the employment of the series of braces P P upon the teeth and shaft, as herein described, I am able to resist the warping or springing of the teeth in such a manner as to keep the points thereof always and at all times perfectly in line, or nearly so, while they are also thereby furnished with much additional strength; sixth, the diminished tendency to bend the teeth out of their proper range, due to the absence of any action of the locking parts upon the teeth except uniformly upon all the teeth through the medium of the shaft A; seventh, the small amount of practice, strength, or skill required to operate the machine properly; eighth, the small cost of the parts when constructed in large quantities, and the small cost of renewing the same in case of any breakage.

Having now fully described my improvements, what I claim as my invention, and desire to secure by Letters Patent, is—

1. The metallic bearing-girdle D, adapted to be fixed upon the shaft A, substantially in the manner and for the purpose herein set forth.

2. The flanges 1 and 2, having the situation described, and employed for the purpose substantially as herein set forth.

3. In revolving rakes, the duplicate sliding bolts I and J, arranged relatively to one or more pairs of reversed stops W Y, and to operate substantially as and for the purpose herein set forth.

4. The sectional eccentric peripheries of the flanges 1 and 2, arranged relatively to bolts I and J and to the operative parts of a revolving rake, substantially as and for the purpose herein set forth.

5. The metallic bush or saddle F, formed with side cheeks, $F' F^2$, and with notches or holes $f' f^2$, arranged to serve in connection with the handle E and with sliding stops I J, substantially in the manner and for the purpose herein set forth.

6. Bracing the entire series of teeth by the employment of the series of braces P P, arranged to form an additional direct connection from the rigid shaft A to the teeth *a*, substantially in the manner and for the purpose herein set forth.

SYLVESTER E. AMENT.

Witnesses:
D. W. STETSON,
W. A. HENDRICKSON.